TELEGRAPH SYSTEM

Filed June 29, 1956

14 Sheets-Sheet 1

INVENTOR.
F. L. CURRIE
BY M. R. Marsh
ATTORNEY

INVENTOR.
F. L. CURRIE
BY M. R. Marsh
ATTORNEY

Sept. 19, 1961 F. L. CURRIE 3,001,008

TELEGRAPH SYSTEM

Filed June 29, 1956 14 Sheets-Sheet 3

INVENTOR.
F.L. CURRIE

BY M.R. Marsh

ATTORNEY

Sept. 19, 1961 F. L. CURRIE 3,001,008

TELEGRAPH SYSTEM

Filed June 29, 1956 14 Sheets-Sheet 4

INVENTOR.
F. L. CURRIE
BY
M. R. Marsh
ATTORNEY

Sept. 19, 1961 F. L. CURRIE 3,001,008

TELEGRAPH SYSTEM

Filed June 29, 1956 14 Sheets-Sheet 5

*INVENTOR.*
F. L. CURRIE

*BY* M. R. Marsh

ATTORNEY

Sept. 19, 1961 F. L. CURRIE 3,001,008

TELEGRAPH SYSTEM

Filed June 29, 1956

14 Sheets-Sheet 6

INVENTOR.
F.L. CURRIE
BY M.R. Marsh
ATTORNEY

Sept. 19, 1961 F. L. CURRIE 3,001,008

TELEGRAPH SYSTEM

Filed June 29, 1956 14 Sheets-Sheet 7

INVENTOR.
F. L. CURRIE

BY F.R. Marsh

ATTORNEY

Sept. 19, 1961 F. L. CURRIE 3,001,008

TELEGRAPH SYSTEM

Filed June 29, 1956 14 Sheets-Sheet 8

INVENTOR.
F. L. CURRIE

BY [signature]

ATTORNEY

Sept. 19, 1961 F. L. CURRIE 3,001,008

TELEGRAPH SYSTEM

Filed June 29, 1956

14 Sheets-Sheet 9

INVENTOR.
F. L. CURRIE
BY [signature]
ATTORNEY

Sept. 19, 1961

F. L. CURRIE

TELEGRAPH SYSTEM 3,001,008

Filed June 29, 1956

14 Sheets-Sheet 10

INVENTOR.
F. L. CURRIE
BY
M.R. Marsh
ATTORNEY

Sept. 19, 1961

F. L. CURRIE 3,001,008

TELEGRAPH SYSTEM

Filed June 29, 1956

14 Sheets-Sheet 11

*INVENTOR.*
F. L. CURRIE
*BY* M.R. Marsh
ATTORNEY

INVENTOR.
F. L. CURRIE
BY
M. R. Marsh
ATTORNEY

Sept. 19, 1961 F. L. CURRIE 3,001,008

TELEGRAPH SYSTEM

Filed June 29, 1956

14 Sheets-Sheet 13

INVENTOR.
F. L. CURRIE

BY M. R. Marsh

ATTORNEY

INVENTOR.
F. L. CURRIE
BY
M. R. Marsh
ATTORNEY

3,001,008
TELEGRAPH SYSTEM

Frank L. Currie, Plainfield, N.J., assignor to The Western Union Telegraph Company, New York, N.Y., a corporation of New York Filed June 29, 1956, Ser. No. 594,995
12 Claims. (Cl. 178—2)

The present invention relates to telegraph reperforator switching systems and more particularly to a system and apparatus for integrating and transmitting received telephoned messages into a telegraph reperforator switching system.

Heretofore it has been the general practice in telegraph systems to record messages that were telephoned into a telegraph office, such as a reperforator switching center, on typewriters and then convey the typed messages to a so-called local sending position where they were manually converted into perforated tape form for automatically processing through the reperforator system.

The above arrangement requires that each message be manually processed twice and it is one of the objects of the present invention to eliminate the necessity of such double manual processing of messages telephoned into a telegraph office.

In automatic switching systems, a receiving position can handle messages much faster than a single operator can receive and record telephoned messages, and it is another object of the present invention to provide an arrangement whereby a plurality of telephone message receiving or recording positions are adapted to work into a single receiving position of the automatic switching system.

Another object of the present invention is to maintain one series of message numbers for the plurality of telephoned message receiving positions so that the messages received at the receiving position of the reperforator system from the plurality of telephone receiving positions are numbered in consecutive numerical order.

A further object of the present invention is to provide a system of the above type incorporating a single sequence of message numbers derived from a single automatic message numbering machine.

A feature of the present invention resides in the provision of an arrangement for automatically appending to each message recorded at a telephoned recording position a number from a common numerical sequence and thereafter transmitting the messages and their respective numbers in numerical order to the receiving position of the reperforator switching system.

Another feature of the invention resides in the employment at the telephoned message receiving positions of an arrangement for preparing received messages both in perforated tape form for transmission to the receiving position of the switching system and in typewritten page form for use such as accounting and billing purposes.

Still another feature of the invention resides in the arrangement whereby certain information which, due to its nature, can not be recorded until after the text of the message is received, is transmitted to the receiving position ahead of the message text.

The above and further objects and features of the present invention will be more apparent in the following detailed description wherein reference is made to the accompanying drawings.

*General operation*

Figure 1:
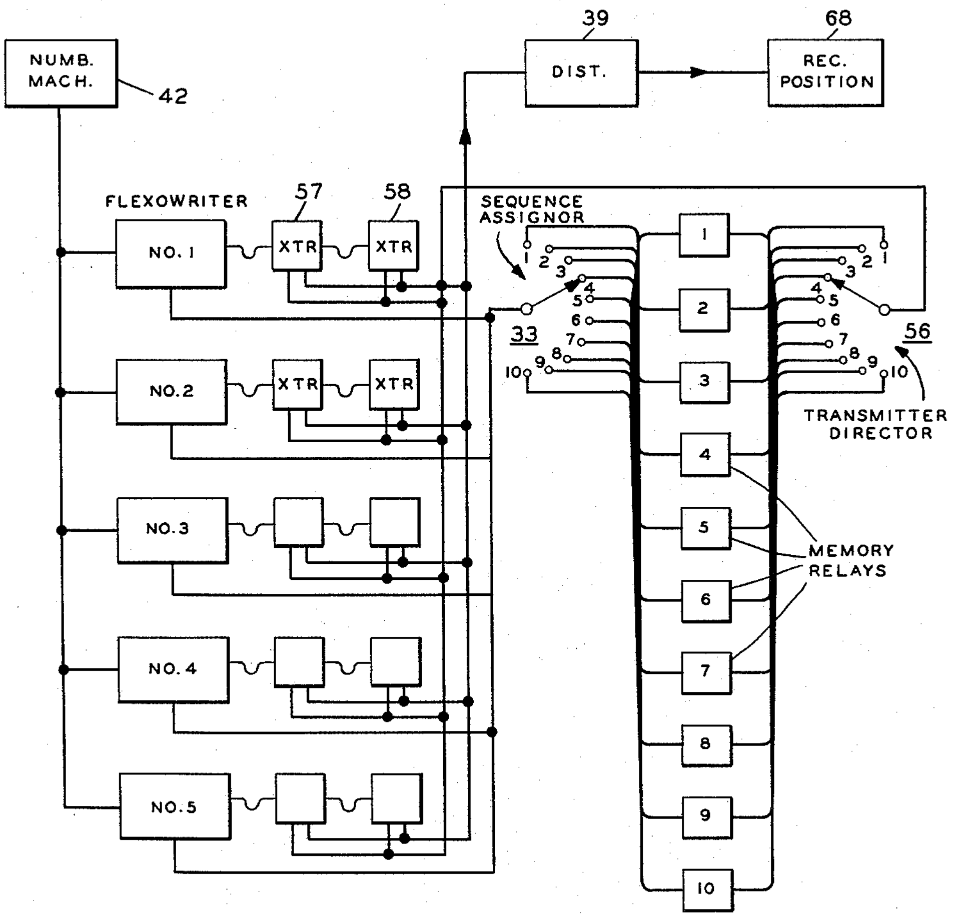
FIG. 1 is a diagrammatic view of some of the units of the present invention.

In general the system of the present invention includes a plurality of so-called telephoned message receiving or recording positions where operators receive messages telephoned into a telegraph office. It has been found that the messages from up to five telephoned message receiving positions can be expeditiously handled by a single receiving position of a reperforator switching system, and the present invention is herein described as including five such positions as an operational unit. It will be obvious, however, that a different number of telephoned message receiving positions could well be employed as an operational unit to meet different conditions.

Each of the telephoned message receiving positions includes as one of its main pieces of equipment a machine herein called a "Flexowriter" which has a manually operable keyboard similar to that of a typewriter. In response to the operation of the keyboard a printing unit records the message in page form while at the same time a perforating mechanism perforates a tape. The page copy of the message is used for monitoring and accounting purposes while the perforated tape is employed to automatically transmit the message to the receiving position of the switching system. In addition to being controlled by the keyboard, the Flexowriter can operate in response to received signals such as permutation signals and, when desired, the perforating mechanism can be disabled so that only the printing unit operates in response to actuation of the key levers.

In the present system the operator answers a call by plugging up into a jack representing the calling line and requests the caller to proceed with the message which is recorded in both page and perforated tape form. When the message is completed, the necessary accounting information is obtained and typed on the page without being perforated in the tape. This information includes the caller's address and other essential information, and after the recording thereof the caller is released and the perforating mechanism reactivated. When working into the receiving position of an automatic switching system, the message must be preceded by the proper selecting characters which the recording operator next records both in printed and perforated form. In addition each message received at the receiving position of the automatic system is consecutively numbered and a number is next recorded by the operator requesting a number from an automatic message numbering machine. The automatic numbering machine is common to the other recording positions of the operational unit and can be associated with any one recording position at a time.

The messages must be received at the receiving position in the same order as the numbers are assigned thereto, and messages may appear in the tapes issuing from the five Flexowriters in any random order. To maintain this consecutive numerical order sets of so-called memory relays are employed together with a sequence assigner, and in the embodiment of the invention disclosed herein the capacity of the memory relays are such that up to ten messages may be stored in the tapes of the Flexowriters at any one time. These ten messages may be all stored in one tape or distributed in any order among the five tapes.

As above set forth, certain information regarding a message can not be determined until after the text of the message has been recorded in the tape and on the page, and this information, referred to as the top line since it is the first line of the message transmitted from the switching system, is the last part of the message recorded at the telephoned message receiving position. To accomplish the transmission of the top line first, the tape from each Flexowriter passes through two tape transmitters which are so controlled that the top line is the first information transmitted to the reperforator receiving position. The two transmitters are controlled by perforations in the tape to transmit desired parts of the message and to idle the other parts therethrough.

The diagrammatic view in FIG. 1 shows and operational unit of the present system including the five Flexowriters numbered 1 to 5 which are associated with a single common numbering machine 42 of the type adapted to transmit consecutive numbers on each cycle of operation. Individually associated with each Flexowriter is a pair of transmitters such as 57 and 58, with transmitter 57 being referred to hereinafter as the top line transmitter and transmitter 58 being referred to as the body or address and message text transmitter.

To record the order in which the different Flexowriters or telephoned message recording positions are connected to the automatic numbering machine, sets of memory relays numbered 1 to 10 are employed. Each set of memory relays consists of a plurality of relays and they control the connections of the recording positions to the common distributor 39 and through it to the receiving position 68 of the reperforator switching system in the same order as the Flexowriters are connected to the numbering machine. The memory relays register the recording position identity in the same order as the sequence of the message number and a sequence assigner switch 33 associates the memory relays one set at a time with the different recording positions as the latter receive message numbers. Also associated with the memory relays is a transmitter director switch 56 which advances from one set of memory relays to the next after each message transmission to effect the next connection between the distributor and the recording position with the next sequentially numbered message.

In the described embodiment of the invention the preparation of ten messages in advance of transmission can be accomplished and these ten messages may be distributed among the tapes of the five Flexowriters in any order. The distributor 39 effects the cross office transmission to the receiving position 68 from the connected recording position. The switching from one transmitter to the other in a given recording position is effected by certain characters or sequence of characters in the tape and the end-of-message signals in the tape are effective to disconnect its transmitters and to connect the transmitters of another position having the next sequentially numbered message stored thereat to the cross-office circuit.

The following detailed description of the essential parts of the system will give a more comprehensive understanding of the system.

*Detailed operation*

Figure 2:
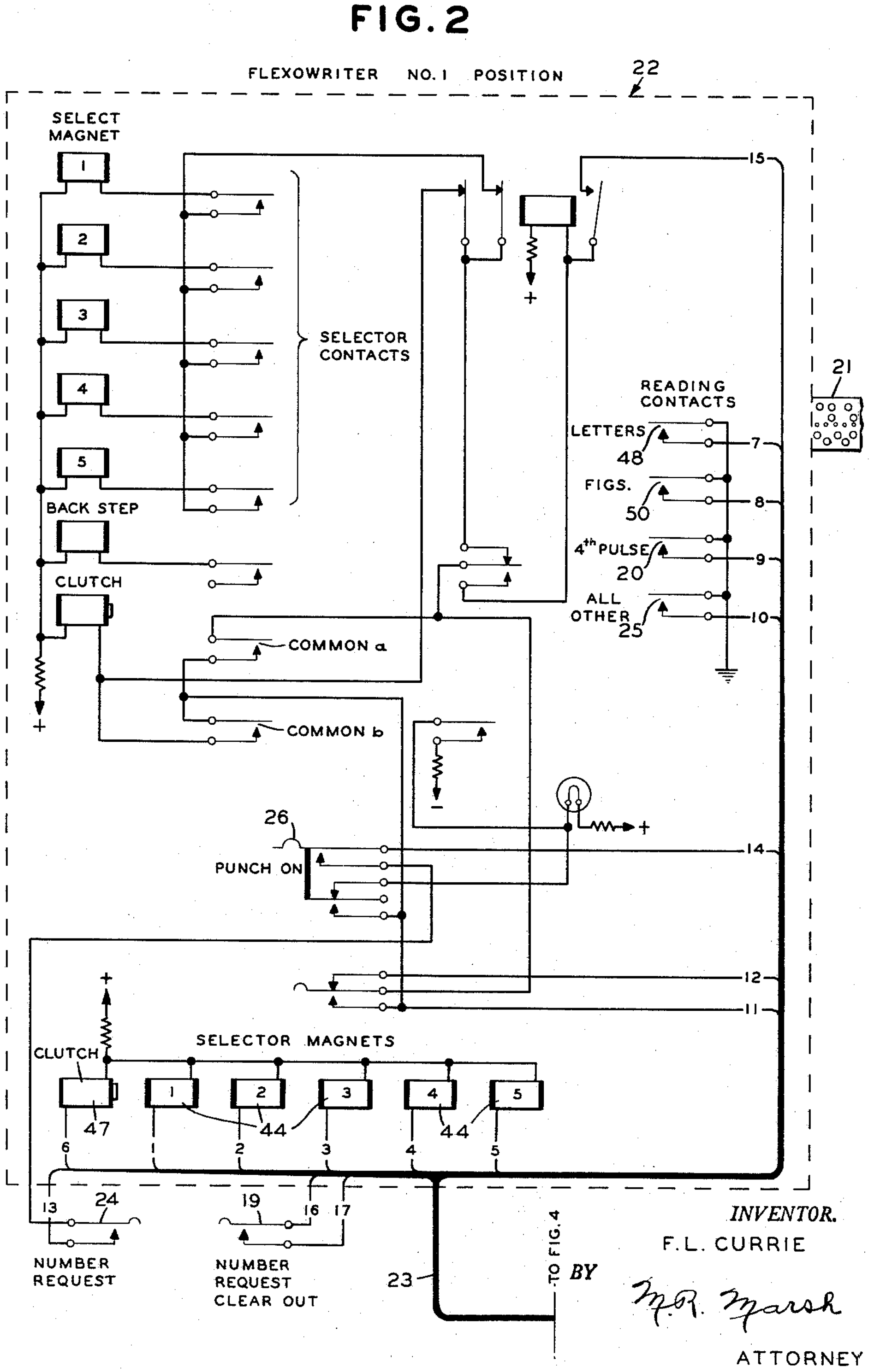
FIGS. 2 to 14 are detailed circuit drawings of the connections and equipment common to a plurality of telephoned message receiving positions and the detailed circuits individual to one such position.

It will be assumed that an operator at a telephoned message receiving position such as the No. 1 Flexowriter position shown in FIG. 2, has received a message over the telephone and by means of the keys on the Flexowriter has recorded the message both in the usual printed page form and on the perforated tape 21 issuing from the Flexowriter 22. The Flexowriter in addition to the usual typewriter key levers includes a number of other keys and elements such as select magnets, selector contacts, reading contacts, selector magnets, and various other control keys and elements hereinafter mentioned.

Figure 13:
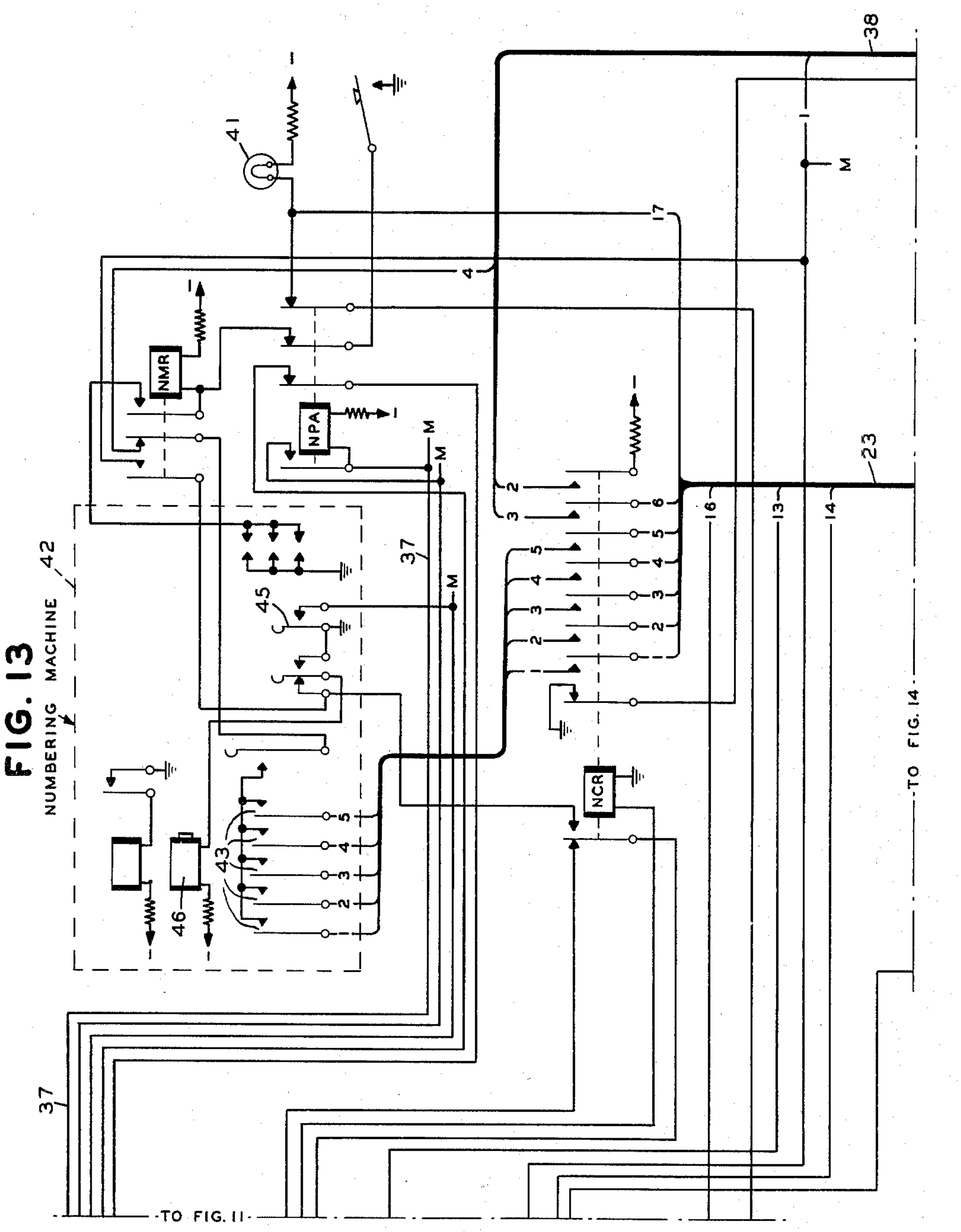

After the address, text and signature of the message are recorded by the Flexowriter, the customer is released and an end-of-message signal recorded. The end-of-message signal in this case consists of two fourth pulse only selection characters, and although the message has been recorded, the top line thereof is yet to be prepared. The operation of the Flexowriter key for a fourth pulse only selection in addition to perforating a corresponding combination in the tape also momentarily closes the fourth pulse contacts 20 of the Flexowriter reading contacts. The Flexowriter is connected to the various relays of the operational unit by a multiconductor cable 23 which terminates in FIGS. 13 and 14 of the drawings and the closure of the fourth pulse contacts completes a circuit for the operation of relay PD–1A. As this relay operates it prepares a circuit for the operation of relay PD–1B when the fourth pulse contacts 20 open, and the operation of the latter relay transfers the fourth pulse reading contact circuit to the second group of fourth pulse reading relays PD–2A and PD–2B.

If the next character should be anything other than a fourth pulse selection, the "all other" contacts 25 of the Flexowriter close and complete a circuit through front contacts of relay PD–1A for the operation of the dump relay CD. The operation of relay CD opens the circuits to relays PD–1A and PD–1B causing them to release, and relay CD releases when the "all other" contacts 25 open. However, if the next character following the first fourth pulse character is also a fourth pulse character, the second closure of the Flexowriter fourth pulse contacts 20 causes the operation of relay PD–2A, and when the fourth pulse contacts open, relay PD–2B operates.

Thus relay PD–2B operates in response to the two consecutive fourth pulse characters and in operating it releases relays PD–1A and PD–1B, prepares a circuit for the subsequent operation of figures reading relays F–A and F–B, prepares a locking circuit for the number finish relay NFR, and prepares a circuit for the operation of the number request relay NRQ.

At this time the message is complete with the exception of the top line which the operator now proceeds to prepare with the keyboard of the Flexowriter. The top line usually will consist of first a pair of destination or switching selection characters when the present system is associated with an automatic switching system; then the next number from the common automatic message numbering machine, the check information and the point of origin, the time and the date.

Figure 11:
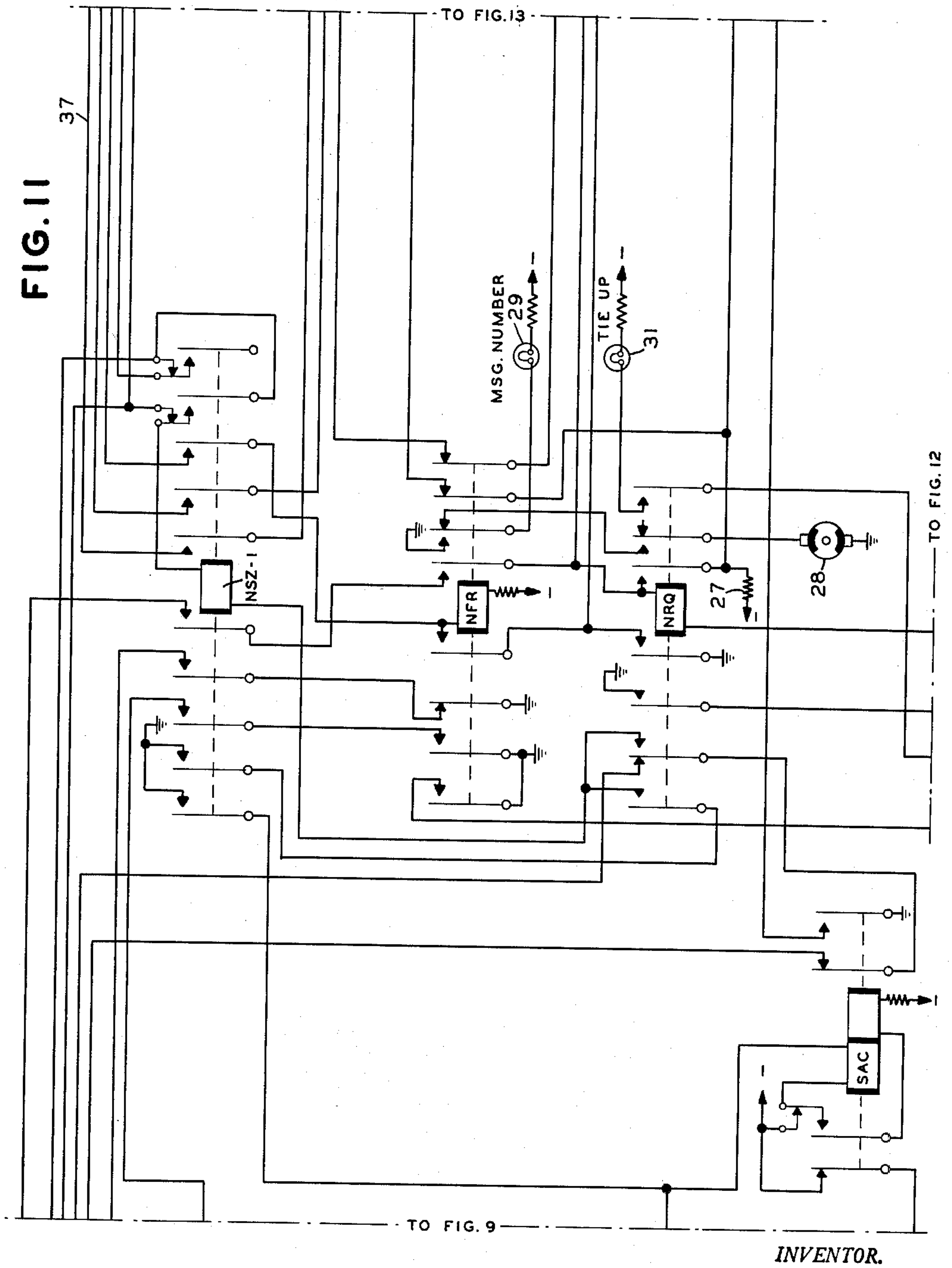

After the message destination indicating or switching characters are punched, the operator of the Flexowriter presses the number request key 24 which causes the operation of relay NRQ (FIG. 11) for requesting the transmission from the common automatic message numbering machine of the next sequential number.

The circuit for relay NRQ begins at ground on closed contacts of relay PD–2B, the coil of relay NRQ, the 14th conductor of cable 23, the upper contacts of punch-on key 26 of the Flexowriter, the contacts of the number-request key 24, the 13th conductor of cable 23, a back contact of relay NFR, to potential at 27. As will be noted, the above circuit includes the upper contacts of the punch-on key 26 so that relay NRQ can not be operated unless the Flexowriter is conditioned to perforate the tape. If for some reason the operator wishes to close out a number request after the request push button 24 has been operated, the operation of the number-request clear-out key 19 will release relay NRQ. Such a condition might exist when the memory relays are all operated. The operation of the clear-out key 19 effectively shunts the coil of relay NRQ.

Figure 8:
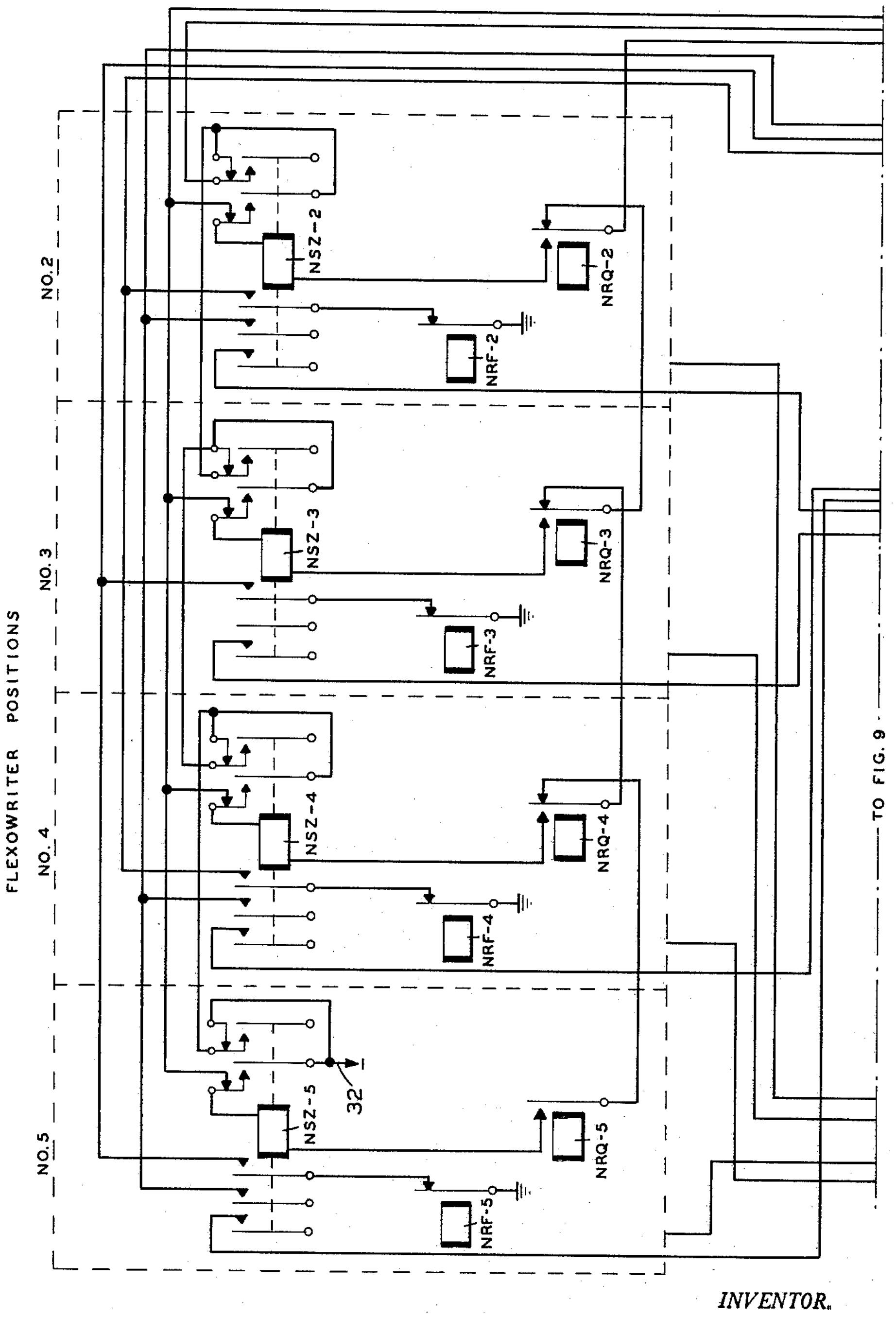

When relay NRQ operates, it completes a circuit from an interrupter 28 through back contacts of relay NFR to a message number lamp 29. This circuit causes the lamp 29 to flash, indicating a number has been requested and no further operation of the Flexowriter keyboard should occur as long as the lamp flashes. The operation of relay NRQ extends an answer-next circuit for the operation of the numbering machine seize relay NSZ–1 of the associated Flexowriter position. The numbering machine seize relays NSZ–1 to NSZ–5 are interconnected in such a manner that only one of these relays can be operated at a time. The circuits of the NSZ relays of the 2 to 5 Flexowriter positions are shown in FIG. 8 along with some of the other relays individual to these positions. By means of the seize relays the numbering machine can be connected to only one Flexowriter at a time.

In addition to the above the operation of relay NRQ shunts the number-request key 24 so that it may be released and completes a parallel ground to the operate circuit of the fourth pulse reading relays PD–2A and PD–2B. Also relay NRQ adds a parallel ground to the operate circuit of the number finish relay NFR to insure that when the latter is operated it will not release before relay NRQ. Another make contact of relay NRQ prepares a circuit for the storage tie-up lamp 31 for warning when the storage is tied up due to improper operation of the hereinafter described memory relays. Still another contact of relay NRQ prepares a locking circuit for the associated seize relay NSZ–1 which is the next relay to operate.

Figure 7:
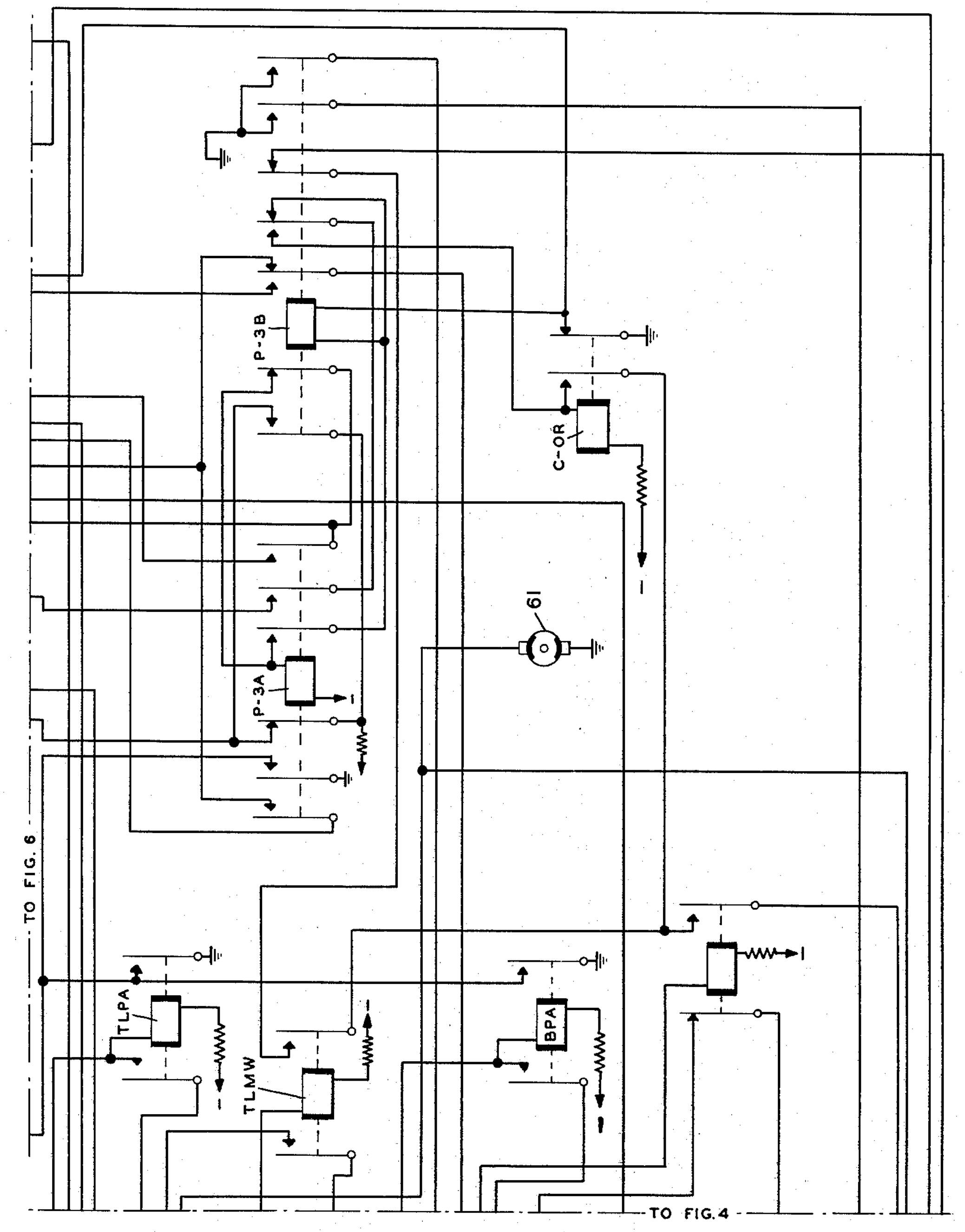
Figure 9:
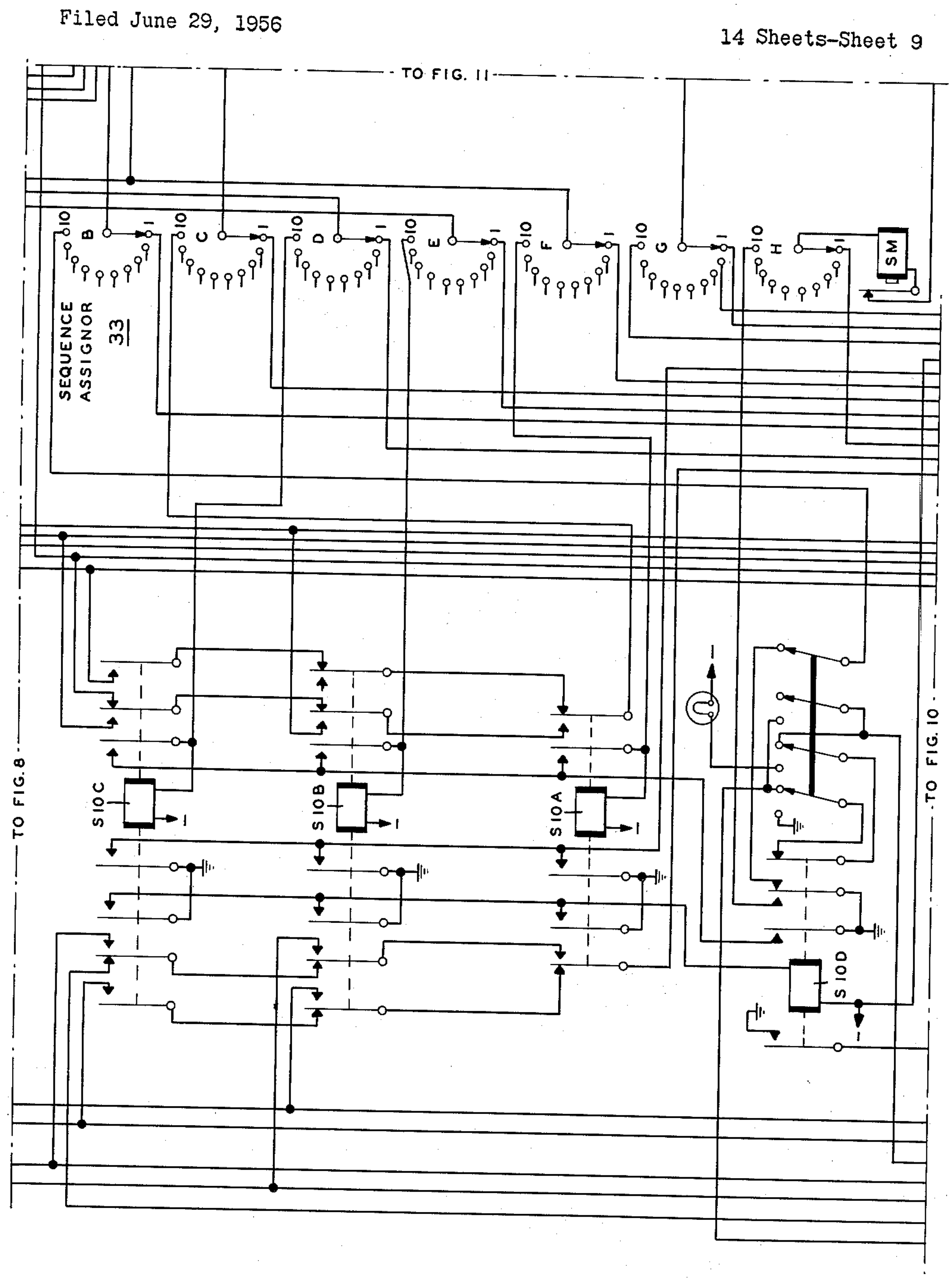
Figure 10:
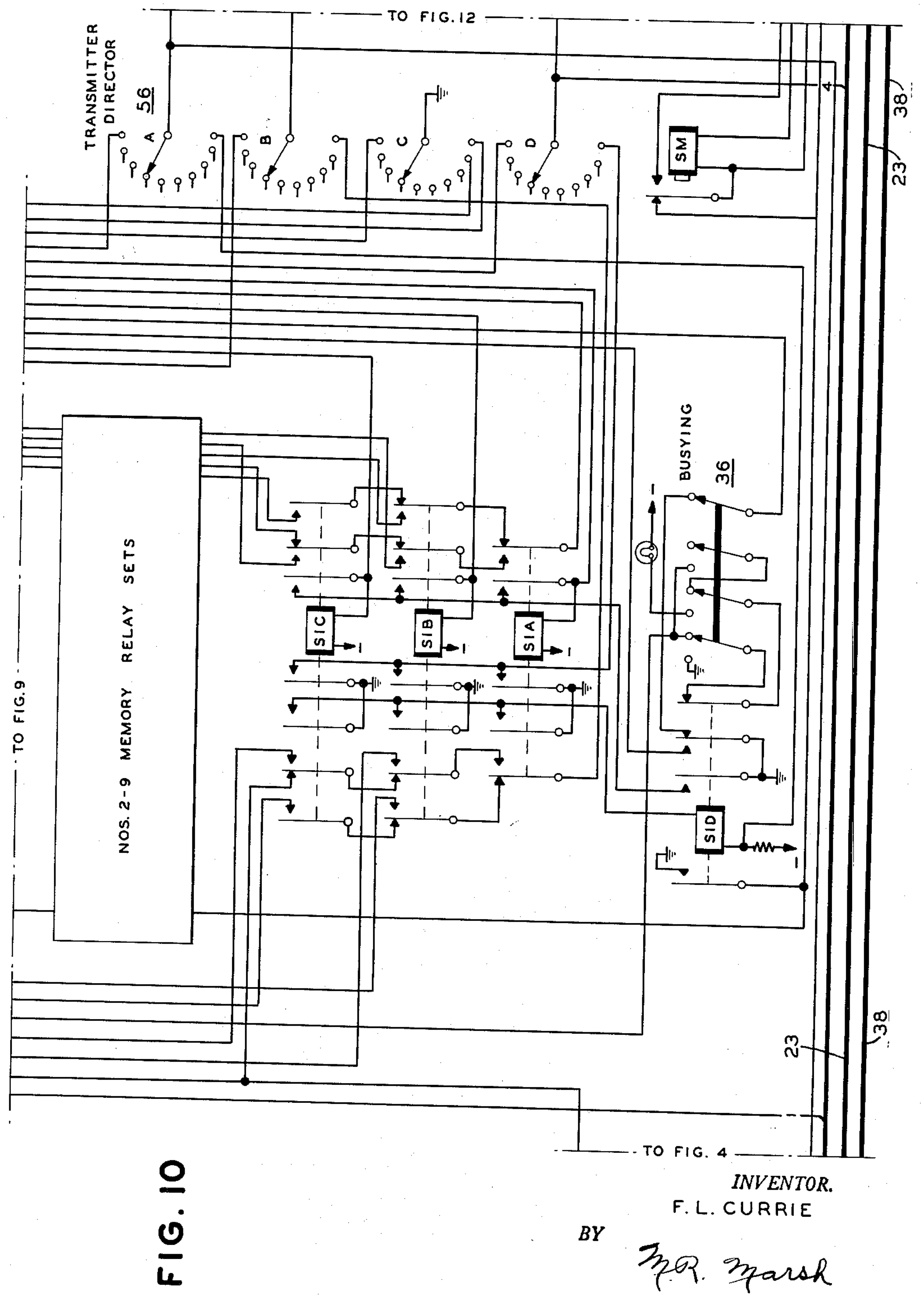

The circuit for the operation of relay NSZ–1 originates at battery 32 on relay NSZ–5 and extends through continuity preserving contacts of this relay and relays NSZ–4, NSZ–3 and NSZ–2 as well as similar contacts of relay NSZ–1, the coil of the latter relay, a front contact of relay NRQ, a back contact of relay SAC, to the wiper of the B level of the sequence assigner switch 33. The sequence assigner switch is a multilevel switch with each level having ten points in the embodiment disclosed herein, with the associated points on each level being respectively associated with a set of memory relays. Accordingly, there are ten such sets of memory relays of four relays each. Circuits for the first set of memory relays S1A, S1B, S1C and S1D are shown in FIG. 10, while the tenth set S10A, S10B, S10C and S10D are shown in FIG. 9. The rectangle 34 represents the memory relay sets 2 to 9, inclusive, they being connected to the sequence assigner switch 33 in a manner similar to that indicated for groups 1 and 10. If it is assumed that the sequence assigner switch has the wipers thereof resting on their No. 1 points, the No. 1 group of memory relays S1A, S1B, S1C and S1D of FIG. 10 will be the next set to be employed to identify the particular Flexowriter to which the next sequence number is assigned. With the sequence assigner switch in contact with its No. 1 points, the above described circuit through the coil of relay NSZ–1 continues through a closed contact of a busying switch 36 and a back contact of relay S1D to ground. Thus relay NSZ–1 is operated and in addition to controlling the lockout circuit to the other NSZ relays to prevent operation thereof for the time being, it also prepares an operate circuit for the number finish relay NFR; prepares an operate circuit for the numbering machine connect relay NCR, and extends a sixth pulse circuit to the numbering machine pulse absorbing relay NPA. The latter circuit begins at potential connected to one side of relay NPA and extends through the coil thereof to conductor 37 which is connected in multiple, as designed by the letter M as are other similar multiple connections, to the other Flexowriter control circuits and continues through a front contact of relay NSZ–1, the back contact of relay NCR, a back contact of relay NFR, to conductor No. 1 of a multiple conductor cable 38 extending to FIG. 7. The other end of cable 38 terminates at a constantly rotating distributor 39, which among other things periodically applies a ground or sixth pulse to the No. 1 conductor of cable 38. Thus on the next sixth pulse applied to this conductor, relay NPA will operate. Other circuits completed by the operation of relay NSZ–1 include a locking circuit for itself, and through the E, D or C levels of the sequence assigner switch 33 serves to operate the proper ones of the memory relays S1A, S1B, S1C and S1D to identify the particular Flexowriter position requesting a number, which in this case is the No. 1 Flexowriter position. Relay NSZ–1 in operating also completes a probe circuit hereinafter described for the memory relays; completes the connection from the memory relays for the release of relay NRQ and causes the operation of relay SAC to prevent any possibility of further stepping of the sequence assigner switch while relay NSZ–1 remains operated.

As set forth, relay NPA operates on the first sixth pulse following the operation of relay NSZ–1 and it prepares a circuit for the operation of relay NCR when the sixth pulse opens. Relay NPA also prevents the operation of another NSZ relay, the operation of the numbering reset relay or the lighting of the Storage Full lamp 41 until after it releases.

The numbering machine 42 (FIG. 13) includes essentially a set of five contacts 43 which are operated in various combinations to represent certain characters and numerals. The numbering machine may be similar to the type disclosed in U.S. Patent 2,193,809 and is adapted to transmit in its cycle of operation a fixed number of identifying characters which are invariably the same, together with a sequence number which varies in numerical order for each cycle of operation.

When relay NCR operates by the opening of the sixth pulse circuit as hereinbefore described, it connects one terminal of each of the five numbering machine contacts 43 to corresponding conductors 1 to 5 of cable 23 which are connected through the coils of the No. 1 to 5 selector magnets 44 of the Flexowriter to potential.

Figure 12:
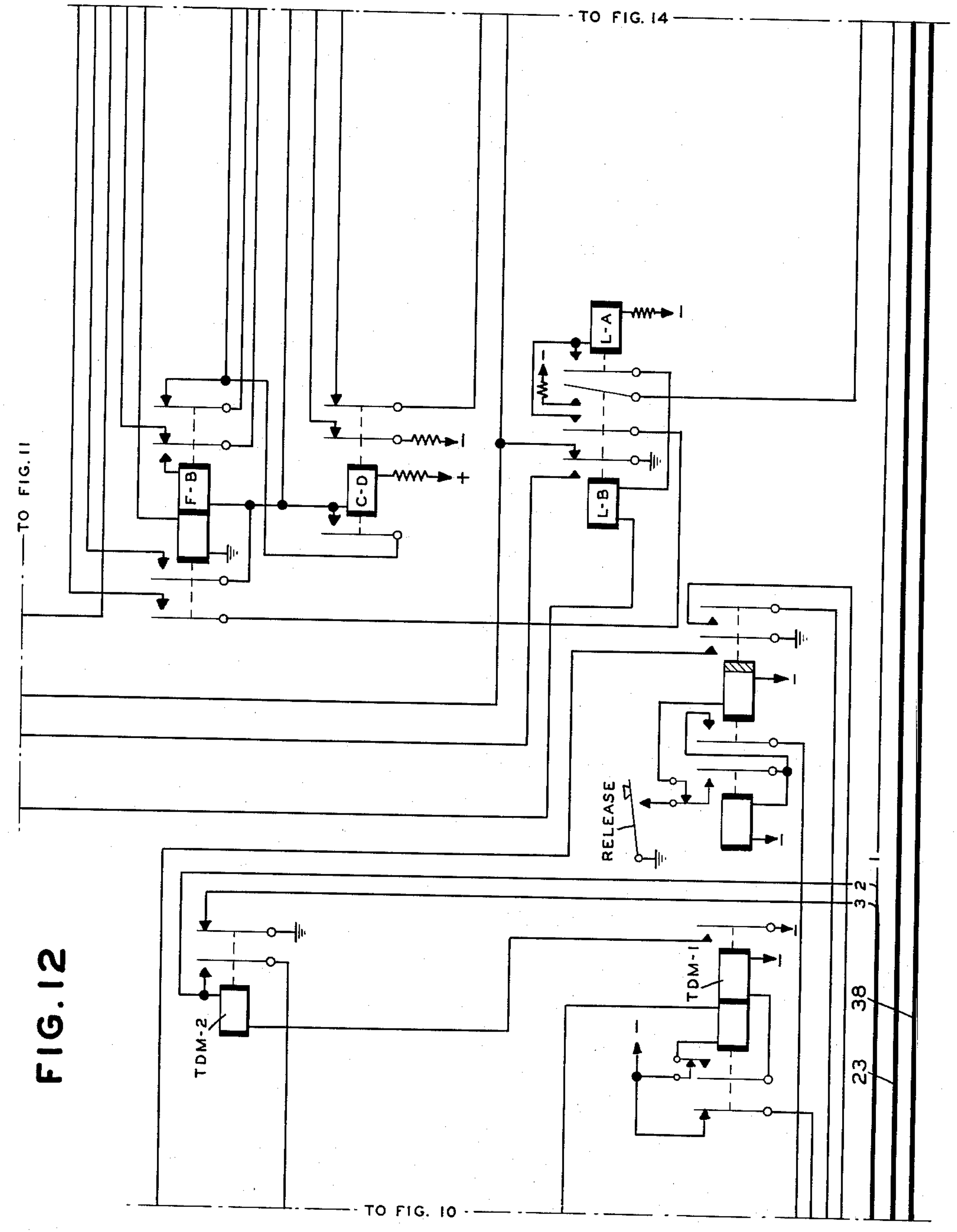

The operation of relay NCR transfers the 6th pulse circuit from relay NPA to the numbering machine operating magnet 46; completes a connection between the distributor 39 and the clutch magnet 47 associated with the selector magnets 44 of the Flexowriter so that the latter operates in proper timed relation; and opens the locking circuit for relay TR, FIG. 12, so that a new tape feed-out may be effected from the Flexowriter automatically at the end of the top line, which is the line in the course of preparation upon the Flexowriter.

Each time a 6th pulse is applied to the operating magnet 46 of the numbering machine 42, a permuted code group of impulses is transmitted to the Flexowriter and stored in the tape as well as being printed on the page of the Flexowriter. On the completion of the numbering machine operating cycle the switch contacts 45 close and complete a circuit from ground through front contacts of relay NSZ-1 and the coil of relay NFR to potential. Thereupon the number finish relay NFR operates and locks itself; opens the initiate circuit for relay NRQ; transfers the circuit of the message number lamp 29 from a pulsing ground to a steady ground causing the lamp to glow steadily; opens the 6th pulse circuit from the distributor 39; opens the circuit which previously functioned for the operation of the selected memory relay; completes the disconnect circuit for relay NRQ; prepares a circuit for the letters character reading relays L–A and L–B and completes a probe circuit for the operation of the connected set of memory relays which in this case will be the S1A, S1B and S1C set. The latter probe circuit completes the disconnect circuit NRQ and causes it to release. The completion of the circuit through the memory relays checks that the proper Flexowriter identify is stored for calling in its associated pair of transmitters when that particularly numbered message is due for the next transmission.

As relay NRQ releases, it transfers the numbering machine initial seize circuit to the NRQ relay of the next Flexowriter position and opens the locking circuit to relay NSZ–1, whereupon this relay releases. Some of the contacts of relay NRQ serve essential purposes when the transmitter or Flexowriter position identity is not properly stored by the memory relay. Among these are contacts which maintain operated the 4th pulse reading relays PD–2A and PD–2B while other contacts complete the circuit for lighting the sequence storage tie-up lamp 31 and still other contacts assure that relay NRQ will always release before relay NFR.

As relay NSQ–1 releases, it opens the circuits to relays SAC, NPQ and NCR which thereupon release and also restores the lockout circuit through its contacts and those of the other NSZ relays. Thus the lockout circuit is conditioned to permit the operation of another or the same NSZ relay when a message is in its respective Flexowriter position is ready or requests the assignment of the next number from the automatic numbering machine 42.

The release of relay SAC reconnects battery to the step magnet SM of the sequence assigner switch 33 and results in that switch advancing its wipers to the points associated with the next idle set of memory relays. Relay SAC in releasing also reestablishes the initial seize circuit for the automatic message numbering machine for the operation of another NSZ relay and opens the circuit to the Storage Full lamp 41. As relay NCR releases, the numbering machine 42 is disconnected from the Flexowriter position with which it was formerly associated.

As relay NPQ releases, it prepares the initial seize circuit for the NSZ relays, opens its own locking circuit, and prepares a circuit for the operation of the numbering machine reset relay NMR. The latter circuit and relay are used normally at the end of the day when it is desired to reset the numbering machine for the start of a new series of numbers.

Figure 14:
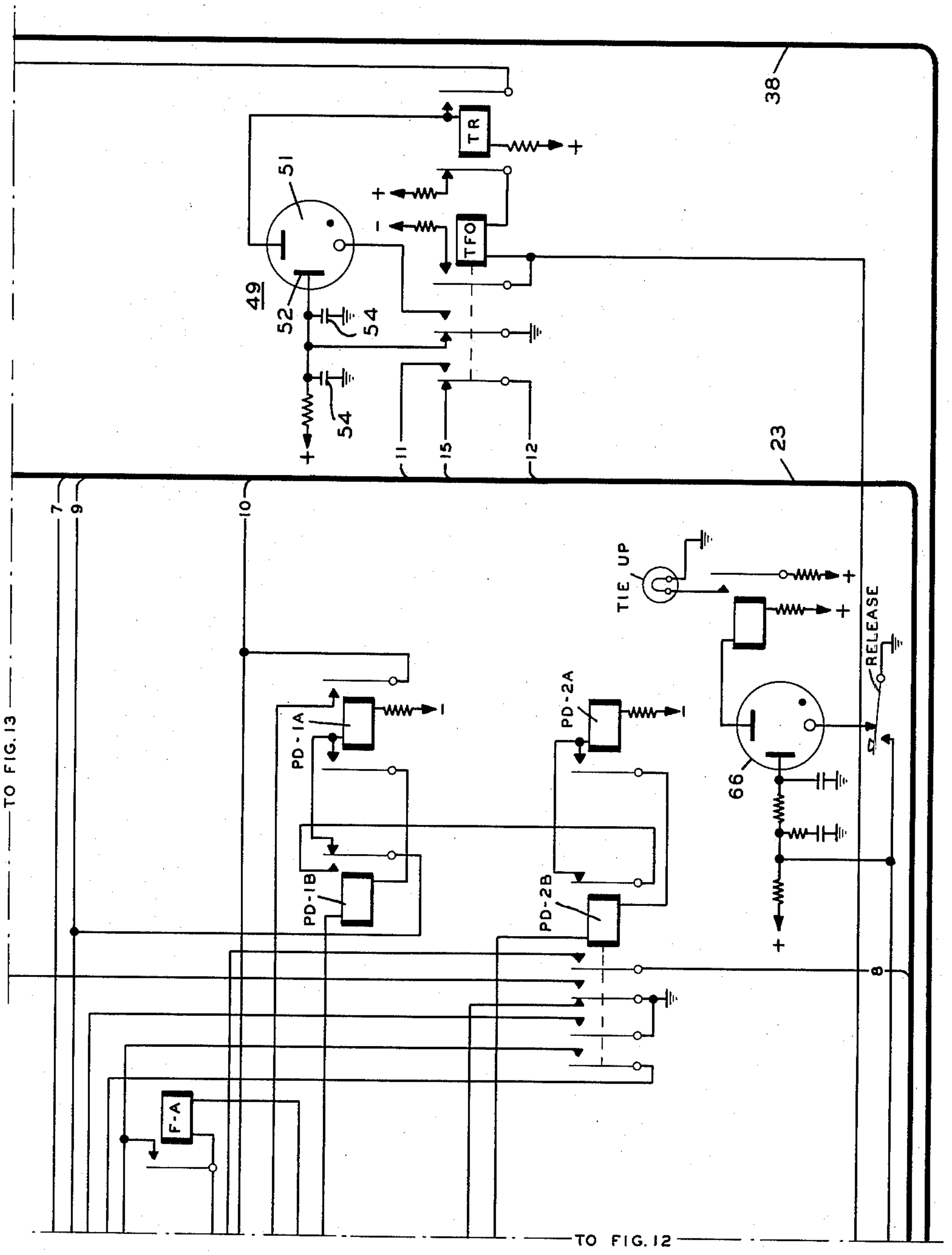

In brief review, the situation at this stage of the message preparation is: the address, the body or text, and the signature of the message have been completed; the end-of-message switching characters have been inserted; and the number from the automatic message numbering machine has been printed on the typed page of the Flexowriter and perforated in the tape 21 issuing therefrom. The operator now completes the top line of the message consisting of the message check, the place of origin, the time and date, and ends with the figures combination followed by a letters combination. The operation of the figures key of the Flexowriter closes contacts 50 thereof completing a circuit through contacts of relay PD–2B for the operation of figures relay F–A (FIG. 14). When the figures contacts 50 open, relay F–B will operate in series with relay F–A. When relay F–B operates, it prepares a circuit for the operation of letters relay L–A, if the next following character is a letters. Relay F–B also opens the figures circuit from the Flexowriter to prevent any further action on those contacts from completing circuits and prepares a circuit for the release of figures relays F–A and F–B by the operation of the dump relay CD when the next character is received.

The next character will cause the operation of the relay C–D and the release of the figures relay F–A and F–B. Should the next character be a fourth pulse selection, the closure of the fourth pulse contacts 20 of the Flexowriter will complete a circuit through front contacts of relay F–B, and the winding of relay C–D to battery to cause the latter relay to operate. The operation of relay C–D removes battery from relays F–A and F–B causing them to release and establishes a locking circuit for itself through front contacts of relay F–A and the left hand winding of relay F–B to ground which insures that battery will not again be applied to the windings of relay F–A and consequently relay F–B, until after relay F–A has been released. The release of relay F–A now opens the locking circuit through the windings of relay F–B and C–D allowing them to release.

If the next character is anything other than a fourth pulse, all other contacts 25 of the Flexowriter will close and complete a circuit through one of the windings of relay F–B, and the coil of relay C–D to battery causing the operation of relay C–D. As described above, relay C–D thereupon operates and locks itself operated through contacts of relay F–A and a winding of relay F–B to ground and removes battery from the operate circuits of these relays causing them and itself to release.

If the next character, however, be letters, resulting in the closure of contacts 48 of the Flexowriter, a circuit will be completed through front contacts of relay F–B and the back contacts of relay L–B, the winding of the letters relay L–A to battery causing the latter relay to operate. At the same time another circuit is completed through the all others contacts 25, the right hand winding of relay F–B to relay C–D, locking the F–B relay operated and causing relay C–D to operate. Relay C–D in operating removes battery from the figures relays F–A and F–B causing relay F–A to release immediately. Relays C–D and F–B, however, are held operated by the circuit through the contacts 25 until the latter opens on the release of the operated key. When this occurs relays C–D and F–B release. The opening of the letters contacts 48 and the release of relay F–B removes the ground to relay L–A which results in relay L–B operating in series with relay L–A.

The operation of relay L–B opens the circuit through the coils of relays PD–2B and PD–2A causing them to release and also completes a circuit for the operation of the tape feedout relay TFO of the timer 49 (FIG. 14). The release of relay PD–2B opens the locking circuit for relay NFR causing it to release which in turn opens the circuit for the letters relays L–A and L–B causing them to release. Relay NFR opens its own locking circuit, extinguishes the message number lamp 29 and prepares an operating circuit for the memory relays when another message is to be stored.

Relay TFO of timer 49 is associated with a timing tube 51, a relay TR together with time delay circuits. The operation of relay TFO closes a tape feedout circuit to the Flexowriter causing the perforating mechanism thereof to commence feeding out blank tape; locks itself operated independently of relay L–B, removes the short-circuiting ground from the timing circuit of the grid 52 of tube 51 and applies a ground to the cathode 53 of said tube. Blank tape will continue to be punched by the Flexowriter until the capacitors 54 in the grid circuit of the tube 51 become sufficiently charged to fire the tube whereupon relay TR operates. The operation of the latter relay releases relay TFO and locks itself operated to ground through back contacts of relay NCR. The latter circuit insures that no more than one automatic tape feed will be made at the end of any one message.

As relay TFO releases, it opens the tape feedout circuit to the Flexowriter terminating the tape feedout, removes the ground from the cathode 53 of tube 51 causing the tube to be extinguished, and grounds the timing network of the tube so as to discharge the condensers 54 and prepare it for a new operation. When the tape feedout is stopped, sufficient tape will have been prepared by the Flexowriter to permit the last code perforation in the tape to pass through both of the transmitters hereinafter described associated with the Flexowriter.

At this point in the operation of the system the message will have been received and all of the recording completed. All of the control relays and other equipment associated with the recording of the message will have been released and the Flexowriter with its associated control receiving relays will be in readiness for the reception of another message.

As hereinbefore set forth, a common group of ten sets of memory relays is used for controlling the connection between the different pairs of transmitters of the Flexowriter positions to the cross-office circuit leading to the reperforator switching system receiving position in order that the Flexowriter positions are connected in the same sequential order as the messages contained therein. For example, the message having the No. 1 number assigned thereto should be transmitted across office before the message assigned number 2 and message No. 2 before message No. 3, etc., since the consecutiveness of the message numbers is checked at the receiving position of the switching system and they must be in consecutive order for proper operation therethrough.

Each set of memory relays is composed of four relays designated S1A, S1B, S1C and S1D for the first set as shown in FIG. 10, and S10A, S10B, S10C and S10D for the tenth set as shown in FIG. 9, the other eight sets being represented by the rectangle 34. The SA, SB and SC relays may be operated singly or in combinations of two for setting up five different selections. For instance, the operation of only relay SA of a set stores a request for the transmitters of the first Flexowriter position; the operation of only relay SB stores a request for the selection of the transmitters of the second Flexowriter position; and the operation of only relay SC stores a request for the selection of the transmitters of the third Flexowriter position. The operation of relays SA and SB of a set is the selection for the fourth Flexowriter transmitters while the operation of relays SA and SC is the selection for the fifth Flexowriter transmitters. Relay SD of each set is common to the set and operates when any one of the other three relays is operated.

Each set of memory relays operates in the same manner and hereinafter the numeral designations of these relays are omitted, it being understood that relay SA indicates any of the relays S1A to S10A; and similarly for the other memory relays. The circuit through some of the right hand tongues and contacts of relays SA, SB and SC is the selective circuit for releasing the NRQ relays. It functions to insure that the proper combination of memory relays are operated for the respective transmitters. Similarly some of the contacts and tongues on the left hand sides of relays SA, SB and SC are the selective contacts for determining the selected transmitters. The operation of an SD relay in response to the operation of any one of the other relays of the respective set furnishes a locking ground for any one or more of the operated relays, and also applies a ground to the respective point on the H-level of the sequence assigner switch 33 for the stepping of that switch when the message preparation is completed. The operation of SD relay also opens the numbering machine Seize Initiate circuit to insure that no additional seizure of such a relay can occur until the completion of the message then in preparation; opens relay set busying circuit to prevent any false indication of that set being idle when the busying switch such as 36 is thrown to its busy position; and completes a start circuit for the transmitter director switch 56.

Since one of the ten sets of memory relays is associated with each message from the time it is assigned a number until it is transmitted to the receiving position of the reperforator switching system, not more than ten messages including the one which may be undergoing cross-office transmission can be stored at any one time. Hence when ten messages are stored, a storage full condition exists which automatically stops further connection of the automatic message numbering machine to another Flexowriter by immobilizing the sequence assigner switch 33. This condition is indicated by causing the storage full lamp 41 to light. The further stepping of the sequence assigner switch 33 is arrested by a circuit on the C level of the transmitter director switch and the G level of the sequence assigner switch. Therefore when the sequence assigner switch advances ten steps ahead of the transmitter director switch, a circuit is completed from ground through the C level of the transmitter director switch, the G level of the sequence assigner switch, and through the left hand coil of relay SAC to battery, causing the operation of that relay. When relay SAC operates, it disconnects battery from the step magnet of the sequence assigner switch 33, opens the initiate seize circuit for the automatic numbering machine, closes a circuit for lighting the storage full lamp 41 and locks itself operated through the G level of the sequence assigner switch 33.

When a set of memory relays is released at the end of a cross-office transmission, the transmitter director switch 56 advances its wipers one step if one or more other sets of memory relays are operated, and opens the locking circuit through relay SAC, allowing the relay to release. Its release extinguishes the Storage Full lamp 41 and restores the circuits to the condition for processing another received message as described.

Figure 4:
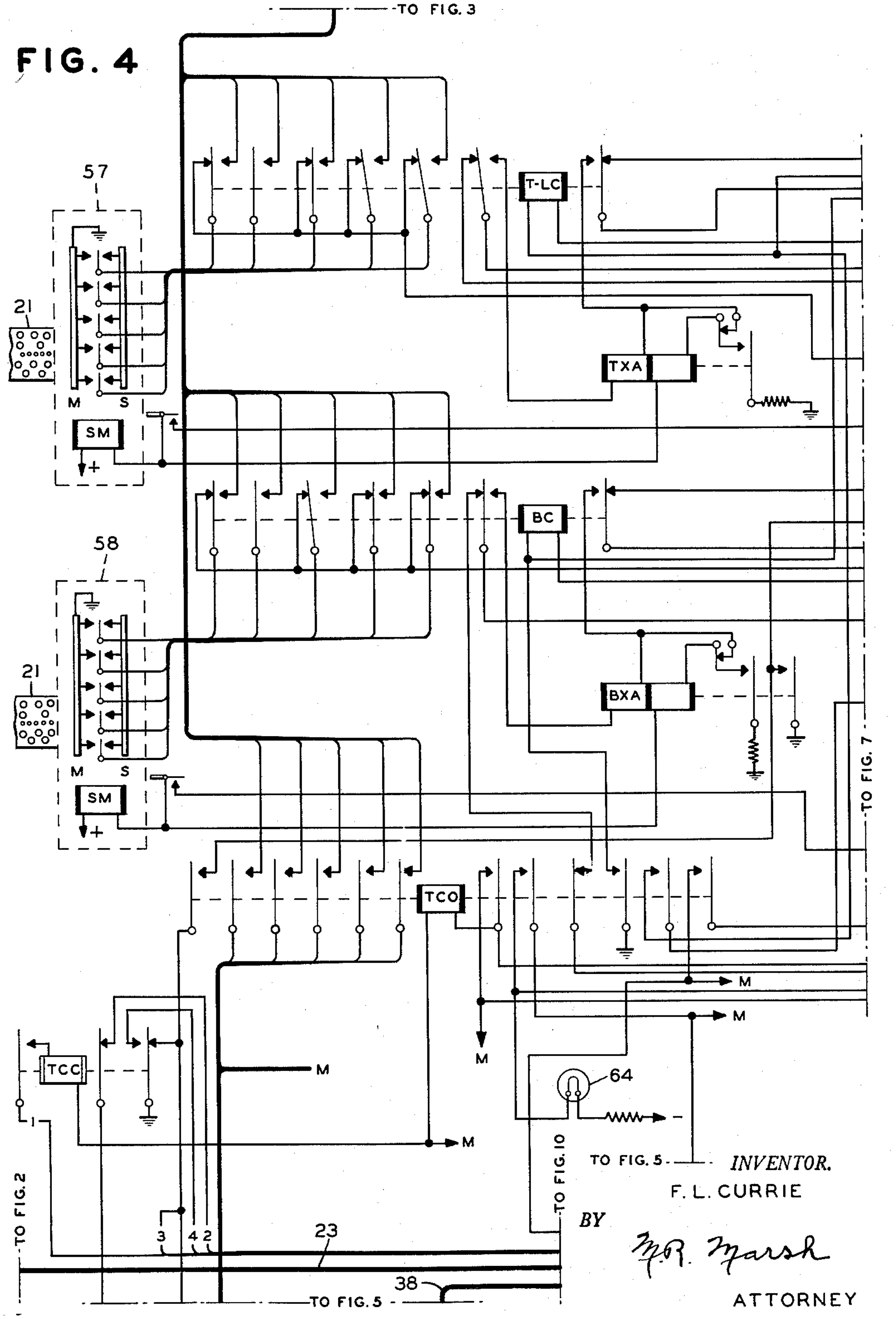
Figure 5:
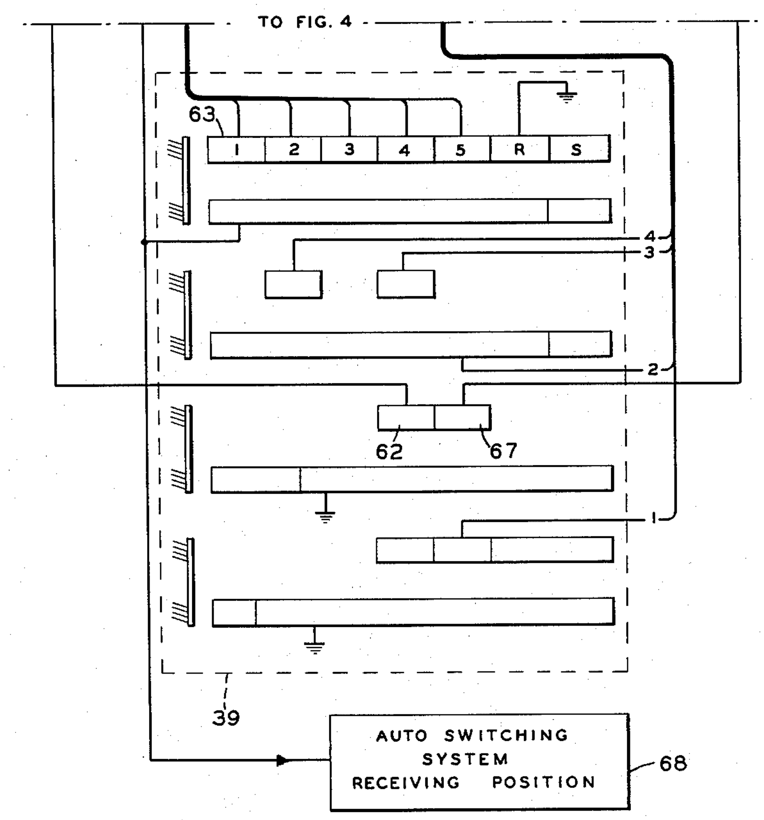
Figure 15:
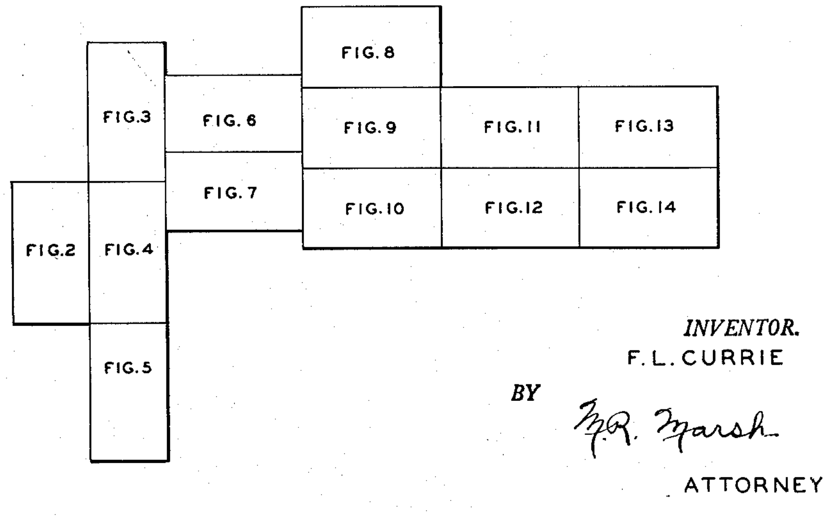
FIG. 15 indicates the manner in which FIGS. 2 to 14 should be arranged with respect to one another.

The manner in which the message stored in the perforated tape 21 is transmitted cross-office to the receiving position will now be described. As hereinbefore set forth, each Flexowriter position has associated therewith two tape transmitters through which the tape 21 passes to control the same. The transmitters 57 and 58, FIG. 4, are so arranged that the tape first passes through the transmitter 57 hereinafter called the top line transmitter and then through transmitter 58 hereinafter called the body or text transmitter. In general the two transmitters operate consecutively with the first transmitter idling through the address, body and signature of the message until a double period combination is read, at which time it then will idle any following blank or period characters in the tape until the first intelligence character is reached. The first intelligence character will cause the top line message waiting relay TLMW to operate. The body transmitter 58 will idle all blank and period characters until its pins detect the first intelligence character which will operate the body message waiting relay BMW. When a connection is made for the cross-office transmission, the top line transmitter 57 will send the top line information until it reaches the switching characters figures letters. This transmitter will thereupon stop and the body transmitter 58 will transmit the address, body and signature until it reaches the end-of-message signal. At that time the cross-office connection will be released but the body transmitter 58 will continue to step. It will now idle through all the top line of the message just transmitted until its end, signified by the figures letters characters. Thus all tape pertaining to the respective message just sent is passed beyond the two transmitters and they will be free for processing the next message in the tape prepared by the associated Flexowriter.

At this time a ground circuit from the impulse unit 59 which serves as an external extra step pulse will be directed through contacts of relay P–2B, back contacts of relays LT–2 and T–LC and the winding of the top line pulse absorbing relay TLPA to battery causing the operation of the latter relay. In operating this relay prepares a circuit for the operation of relay T–LC at the end of the pulse. At that time relay T–LC operates in series with relay TLPA. When the top line connect relay T–LC operates, it extends an extra step pulse through the autocontrol relay TXA to the step magnet SM of the top line transmitter 57; prepares the circuit for the operation of the autocontrol relay TXA when tight tape occurs at the transmitter and disconnects the transmitting contacts of the top line transmitter from the message waiting relay T–MW and connects them to the control electrodes of the five reading tubes T–1 to T–5. The transmitter 57 will now operate in response to the pulses from the unit 59 and will idle all tape therethrough until the end-of-message signal is reached at which time the first 4th pulse selection will activate tube T–4 and its associated pulse relay P–4. When relay P–4 operates, it completes a circuit for the operation of the probe relay and also completes a circuit for the operation of the first period relay P–1A. The circuit to P–1A includes various contacts of the pulse relays as well as contacts of relay P–2B. At the end of the 4th pulse selection and as the pins of the transmitter are withdrawn to remove ground from the control grid of tube T–4, it is cut off and releases its associated relay P–4. As relay P–4 releases it disconnects the probe ground from one of the terminals of the winding of relay P–1A allowing relay P–1B to operate in series with the relay P–1A.

The operation of relay P–1B transfers the 4th pulse selector circuit to the second series of period reading relays P–2A and P–2B which operate in a similar manner in response to the second 4th pulse selection character. If the second character is any other than a 4th pulse selection character, the dump relay D will be operated to release relays P–1A and P–1B. However, it will be assumed that the second character is a 4th pulse selection and results in the operation of P–2B at the end thereof. Thus, in response to the double period constituting the end-of-message signal at the end of the address the body and signature of the message will have been stepped through the transmitter 57, read and recorded.

In the meantime by the action of another extra step pulse circuit which passes through contacts of relay TCO, the body transmitter 58 idles blank tape and fourth pulse selections through itself until an intelligence character is reached. Thereupon a circuit is completed from ground through one or more of the contacts of transmitter 58 and one or more of the back contacts of relay BC through the winding of the message waiting relay BMW to battery causing the operation of the latter relay. The operation of relay BMW opens the extra step pulse circuits to the step magnet of transmitter 58 and prepares part of the initial seize circuit for the operation of relay TCO.

The operation of relay P–2B as mentioned above, opens the operate circuit of relay P–1A and P–1B causing them to release; transfers the 4th pulse selection circuit to relay P–3A for latter operation of that relay; transfers the probe relay ground circuit from the period reading contacts of the pulse relay P–1 to P–5 to the figures contacts of the same relays, prepares an operating circuit for relay LT–2; transfers the pulse step circuit for the top line transmitter 57 to contacts of relay TCO for subsequent connecting to the step pulse of the distributor 39; opens the operating circuit of relays T–LC and TLPA causing them to release and prepares the circuit for the reoperation of the latter two relays when transmission of the message is completed to the cross-office circuit.

The release of relay T–LC again connects the extra step pulse circuit through the step magnet of transmitter 57 to permit it to step until all blanks and period characters in the tape are stepped through it. The first intelligence character appearing therein completes a circuit through one or more of the back contacts of relay T–LC and the winding of TLMW causing the latter to operate. The operation of relay TLMW opens the extra step pulse circuit and completes the preparation of the initial connect circuit for the operation of TCO when the time comes for the message in transmitter 58 to be transmitted across office.

At this stage of the operations, a message has been completed and properly positioned at the two transmitters 57 and 58 for cross-office transmission. The control relays for this transmission are properly operated for requesting a connection and for controlling the transmitters in such a way that a message will be sent cross-office in the proper message form. When the messages in these transmitters are to be sent, the transmitter director switch 56 will have its wipers advance to the respective points associated with the particular set of memory relays at this time associated with the pair of transmitters being considered. When the wipers of switch 56 advance to that point, a mark ground will appear on the D level of that point which originates through a make contact of one of the relays SA, SB, or SC. This ground is extended through the D level to the coil of relay TDM–1 causing it to operate.

The operation of relay TDM–1 completes a circuit for the operation of relay TDM–2 by a circuit from ground through a segment 62 of the distributor 39. The above circuit includes back contacts of relay TCC. The operation of relay TDM–1 also opens the circuit to the step magnet of the transmitter director switch 56.

The operation of relay TDM–2 prepares a circuit through the B level of switch 56, the selector contact chain including left hand contacts of relays SA, SB, or SC through the winding of relay TCO and relay TCC to ground. The latter two relays operate in series when the grounded circuit from segment 62 is open. Relay TDM–2 also removes the idle condition short circuiting ground from the cross-office circuit and connects that line to the cross-office transmitter in phase with the rotating brushes of the distributor 39.

As relay TCO operates, it prepares a circuit for clearing out the connection to the distributor at the end of message; prepares the operate circuit for relays T–LC and TLPA; prepares the operate circuit for relays BC and BPA; opens the extra step pulse circuit to transmitter 58, connects the 6th pulse circuit from the distributor 39 to the winding of relay TLPA, causing the latter to operate at the first closure of the 6th pulse circuit; closes a locking circuit for its own winding; prepares a circuit for closing the line when relays TXA, BXA or P–3B operates; and closes the 5 pulse contact circuits from relay T–LC and BC to the 1 to 5 number segments of ring 63 of the distributor. In addition, relay TCO prepared a circuit for the 6th or step pulse to flash the operate lamp 64 to indicate the Flexowriter position that is connected to the cross-office circuit.

The operation of relay TCC completes a circuit for maintaining the transmitter connect failure timer circuit 66, FIG. 14, in an unoperated condition; opens the initiate operate circuit for relay TDM–2, disconnects ground from the cross-office line circuit, and applies a locking ground to relay TDM–1. The operation of relay TCC also serves to maintain the cross-office circuit closed at all times when no connect relay TCO is operated, and also insures that relay TDM–1 will not release and start establishing a second connection to the cross-office circuit before the first has been disconnected. As mentioned above, the sixth pulse circuit from segment 67 of the distributor 39 causes the operation of relay TLPA which in operating prepares a circuit for the operation of relay T–LC at the end of the first pulse from this segment.

When relay T–LC operates, it transfers the sixth pulse circuit to the step magnet of transmitter 57, completes the circuit through the coil of relay TXA, disconnects all the pulse contacts of transmitter 57 from the winding of relay TL–MW, causing the latter to release, and connects the tongues of transmitter 57 to the distributor 39 and to the reading tubes T1 to T5.

At this stage of operation the top line transmitter 57 is being actuated by the sixth pulse circuit, and sends all the top line information contained in the tape 21 through the distributor 39 to the cross-office receiving position 68 of the automatic switching system. As each character is transmitted cross-office, it is examined by the reading circuit, FIG. 3, to determine when the two characters, figures letters, appear signifying the end of the top line and that this transmitter should release and that the text transmitter 58 should start and complete the message transmission. On the occurrence of the figures letters combination, relays A, B, LT–1 and LT–2 operate through obvious circuits and at the end thereof relays LT–2 and LT–1 are operated.

The operation of relay LT–2 reestablishes a circuit for relays P–1A and P–1B, transfers the probe circuit from the figures and letters contacts of the pulsing relays to fourth pulse selection contacts of these relays; transfers the sixth pulse circuit from relay T–LC and TLPA to relays BPA and BC; opens the operate circuit of relay T–LC and TLPA causing them to release; prepares the circuit for subsequent operation of relays P–3A and P–3B; opens the operate circuit for relays A and B causing them to release, prepares the circuit for the operation of relay C–OR at the end of a message, and opens a ground connection to the operate circuit of relays BC and BPA. Relays P–3A and P–3B are now in readiness to function at the end of a message.

Figure 3:
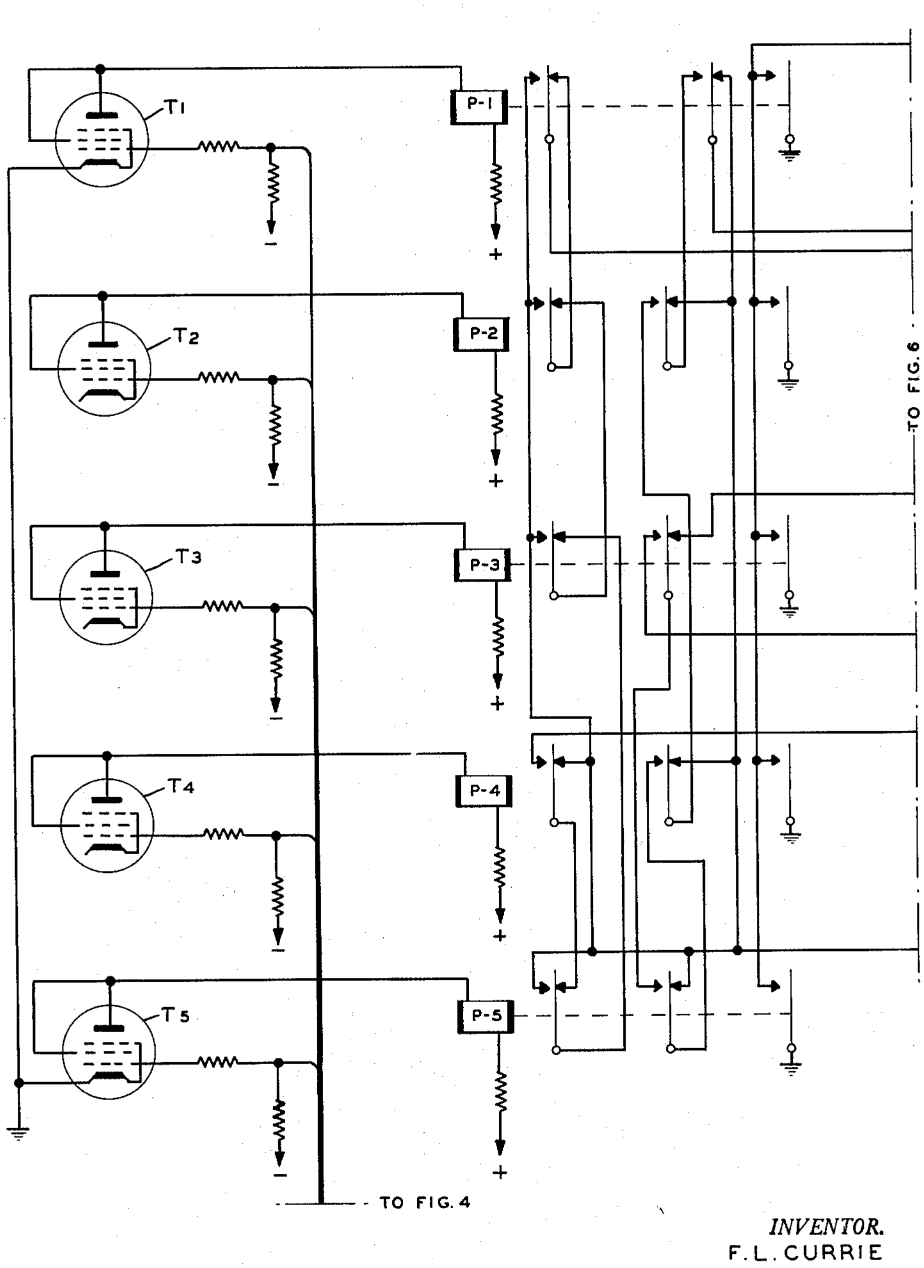

At this point the top line information has been transmitted to the receiving position 68 and the sixth pulse circuit is extended through contacts of relay BC to the winding of relay BPA. This relay operates on the next sixth pulse followed by the operation of relay BC at the end of that pulse. When relay BC operates, the sixth pulse circuit is transferred to the step magnet of transmitter 58 through the autocontrol relay BXA and in general functions with respect to transmitter 58 in much the same manner as relay T–LC functioned in control of transmitter 57. Now the circuits are set up for the transmitter 58 to transmit through the distributor 39 to the receiving position 68 the address, the text, and signature of the message, and the reading circuit of FIG. 3 is conditioned to detect the end-of-message signal. This signal consists of two fourth pulse selection characters and its detection in a manner similar to that described above results in the operation of relay P–3A. If some other character intervenes between the two fourth pulse selections, the dump relay D is operated, causing the release of relays P–1A and P–1B which operate in response to the first fourth pulse selection character. The operation of relay P–3A prepares a circuit for the operation of relay P–3B when the ground connection is removed from the coil of relay P–3A; prepares a locking circuit for ground through contacts of relay LT–2 to insure that this relay will always release first; completes a shunt circuit for the probe circuit which resulted in the operation of relay P–3A; maintains the step pulse circuit and opens the operate circuit of relays LT–1 and LT–2 causing them to release. The release of relay LT–2 completes and interrupts circuits permitting the operation of relay P–3B in series with relay P–3A.

As the result of the operation of relay P–3B an operate circuit is prepared for relays LT–1 and LT–2 so that they can again be operated and the connection from the 4th pulse selection character operate circuit is opened. Relay P–3B in operating also transfers the step circuit for transmitter 58 from the distributor to the external extra step pulse circuit; prepares a circuit for operating relay C–OR; opens the circuit of relay TCO; completes the circuit from ground through contacts of relay TCO, the A wiper of the director switch 56 to the battery side of the involved SD relay causing it to release; opens the locking circuit to relay P–BA and applies a ground to the cross-office circuit. When the involved SD relay releases, it opens the operate circuits of its three associated SA, SB and SC relays causing the operated ones to release; unbusies the corresponding point on the H level of the assign switch 33, prepares the automatic numbering machine seize circuit to the B level of switch 33; removes a ground from the transmitter director switch interrupter springs so that if no other set of memory relays is waiting for a connection there will be no further stepping of this switch.

The release of the operated ones of the SA, SB and SC relays of a set opens the circuit to the D level of the director switch 56 and thence to relay TDM–1 causing it to release which in turn releases relay TDM–2. The latter two relays in releasing releases relays TCO and TCC.

The release of relay TCO disconnects the involved pair of transmitters 57 and 58 from the distributor 39; opens its own locking circuit, opens the 6th pulse circuit, connects the independent extra step pulse to the step magnet of transmitter 58; removes one of the ground connections from the operate circuit of relay BC; opens one of the operate circuits of relays T–LC and TLPA; and, opens the disconnect circuit for releasing the operated SD relay.

As relay TCC releases, it removes its ground connection from the transmitter connect failure timer circuit 66; grounds the cross-office circuit; prepares an initial operate circuit from relay TDM–2 and removes the locking ground from relay TDM–1. At this time, relay P–2B is operated and relay LT–2 is released so that the operate circuit for relays BC and BPA are uninterrupted.

Figure 6:
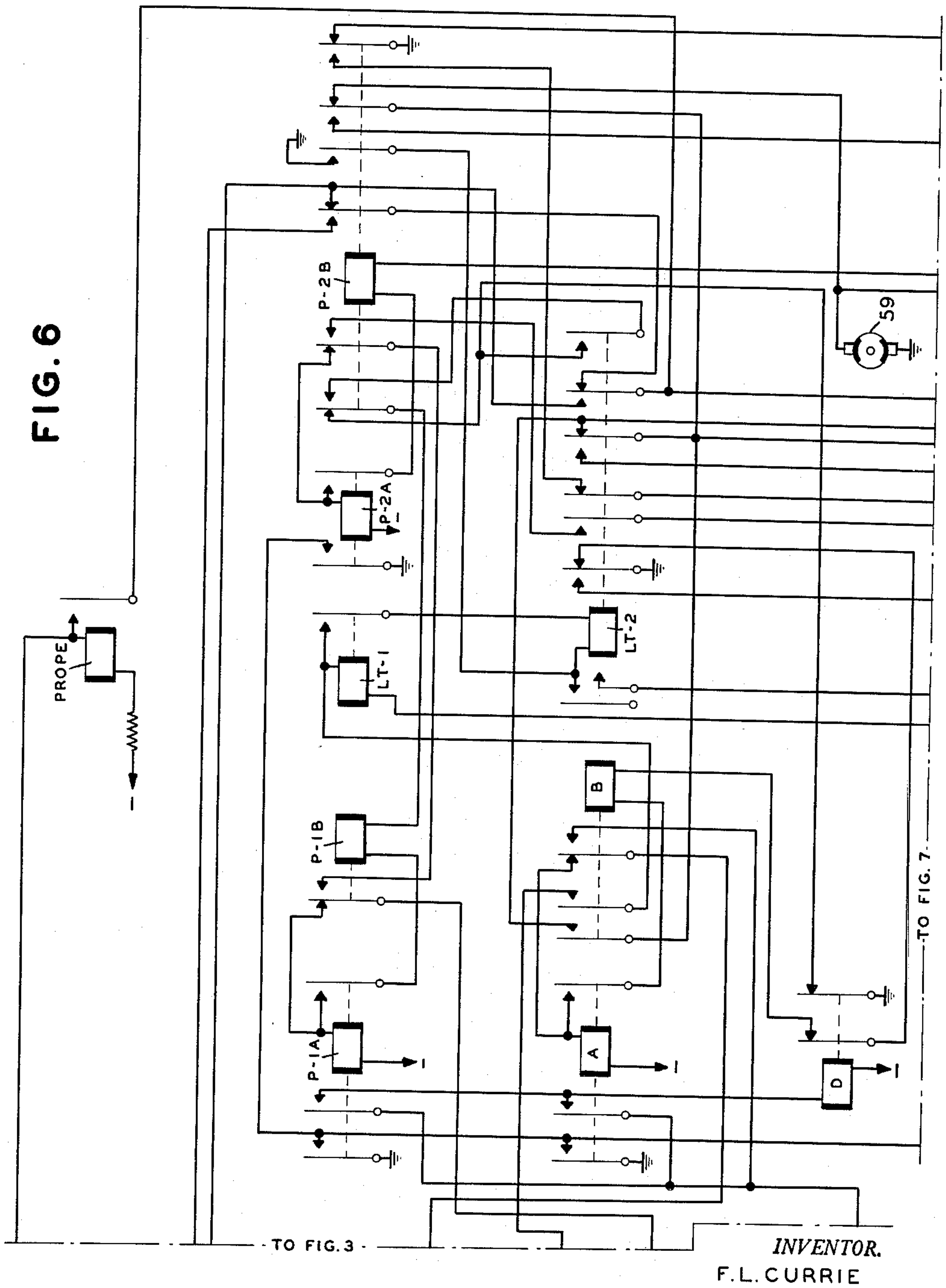

Therefore, the extra step pulse which is directed to the step magnet of transmitter 58 will effect the stepping of the tape therein until the figures letters characters are reached. Thus, the stepping of the top line portion of the tape for the last sent message is stepped through the body transmitter and it is ready for the handling of another message. The detection of these characters is effected by the reading circuit of FIG. 3 and some of those of FIG. 6 and results in the operation of relay A, followed by the operation of relay B.

The operation of relay B transfers its figures reading selector circuit to relay D so that if the next character is any other than a letters character, relay D will operate and prepare the selector circuit to relay LT–1.

The operation of LT–1 prepares a circuit for the operation of LT–2 at the end of the transmission of the letters character. Relay LT–2 in operating, opens the circuit to relay BC causing it to release, opens the circuit for relays A and B causing them to release, completes a circuit for the operation of the clear-out relay C–OR and opens the extra step pulse circuit to relays TLPA and TLC.

The operation of relay C–OR performs the final clear-out of all operated relays having to do with the previous message transmission. It locks itself operated through all operated relays so that it will not release until the last one of those relays has first released. It removes the ground connection from all of those relays through its contacts resulting in their release, then relay C–OR itself releases. At this time the equipment and circuits involved have been restored to their normal idle condition in readiness for processing the transmission of another message.

While the invention has been described in but a single preferred embodiment thereof, it will be obvious that modifications can be made therein without departing from the essential spirit and attributes thereof, and it is desired therefore, that only such limitations be placed therein as are specifically set forth in the appended claims.

What is claimed is:

1. In a telegraph system, a plurality of tape controlled transmitting means each having an individual control storage tape for storing signals representing messages, means for generating a single sequence of message number signals, means for randomly requesting message numbers from said sequence of numbers for association with stored messages with the individual sequence numbers distributed to said storage tapes in the random order in which requests are made therefor, a sending circuit adapted to have signals transmitted thereover, means for individually connecting said transmitting means to said sending circuit for the transmission over said sending circuit of the signals of one stored message at a time, and means for automatically controlling said connections to transmit said messages to said circuit in the order of the sequence of message number signals appended thereto.

2. In a telegraph system, a plurality of storage mediums individually associated with a plurality of message transmitters, a common message sequence number transmitter, means including said last-named transmitter for storing consecutive message sequence numbers in said storage mediums in conjunction with the storage of messages therein and with said consecutive numbers being assigned to the messages in said mediums without selectivity amongst them, an automatically transmitting circuit adapted to have signals transmitted thereover, and means including said message transmitter for sending stored messages to said circuit in the sequential order of the message numbers in said storage mediums.

3. In a telegraph system, a plurality of storage tapes for storing messages, means for numbering said messages with numbers from a single numerical sequence of numbers with said numbers distributed at random among said storage tapes to individually number the messages therein, identifying means independent of said tapes for identifying the order of the assignment of the message numbers thereto, transmitting means and means including said identifying means for controlling said transmitting means to transmit said messages in the numerical order of their sequence numbers.

4. In a telegraph system, a plurality of storage tapes, said tapes having messages stored therein with each message including a message sequence number from a single numerical sequence of numbers and with said numbers distributed among said storage tapes without selectivity amongst them, a transmitting circuit and means for automatically transmitting messages from said storage tapes to said circuit in the sequential order of the sequence numbers thereof.

5. In a telegraph system, a plurality of message storage mediums, means for storing messages in said mediums with each stored message assigned a number from a common numerical sequence and with the numbers distributed among said mediums in random order, separate transmitting means individually associated with each of said mediums, a sending circuit and means for automatically and individually associating said transmitting means one at a time with said circuit to transmit stored messages thereover in accordance with the sequential order of the sequence numbers thereof.

6. In a telegraph system, a message storage tape having messages stored therein with each message including a text section followed by an identifying section, a pair of tape transmitters through which said tape is arranged to pass in series, a sending circuit adapted to have signals transmitted thereover, and means controlled by said transmitters for automatically associating the same one at a time with said sending circuit and in such an order as to transmit the identifying sections of stored messages to said sending circuit ahead of respective text sections.

7. In a telegraph system, a plurality of perforating mechanisms for storing messages in individually associated tapes, individual transmitting means associated with each of said tapes, an auxiliary transmitter, means for associating said auxiliary transmitter in random order with said perforating mechanisms one at a time to operate the same to perforate its tape, a sending circuit adapted to have signals transmitted thereover and means for associating said individual transmitting means one at a time with said circuit and in the same order as the association of said auxiliary transmitter with said perforating mechanisms.

8. In a telegraph system, a plurality of perforating mechanisms for storing messages in respective storage tapes with each message being terminated by an end-of-message signal, an automatic signal transmitter for generating individual message identifying signals, said transmitter being connectable to any one of said perforating mechanisms at a time, a switching means controlled by the perforation of an end-of-message signal in a storage tape for controlling association of said automatic transmitter with the respective perforating mechanism to cause perforation of message identifying signals in the tape accompanying each stored message, transmitting means for each of said tapes, a transmitting circuit for the transmission of signals thereover, and means for operating said transmitting means to transmit to said circuit messages stored in respective tapes in the same order as the order of association of said automatic transmitter with said perforating mechanisms.

9. In a telegraph system, a plurality of perforating mechanisms for storing messages in respective storage tapes with each message being terminated by an end-of-message signal, an automatic signal transmitter common to all of said perforating mechanism, means controlled by the perforation of an end-of-message signal in a storage tape for controlling association of said automatic transmitter with the respective perforating mechanism to operate the same and cause storage in the tape of message identifying signals following its respective message, transmitting means for each of said tapes and means for operating said transmitting means to transmit the message identifying signals ahead of its respective message.

10. In a telegraph system, a plurality of perforating mechanisms for storing messages in respective storage tapes with each message being terminated by an end-of-message signal, an automatic signal transmitter common to all of said perforating mechanisms, means controlled by the perforation of an end-of-message signal in a storage tape for controlling association of said automatic transmitter with the respective perforating mechanism to operate the same and cause storage in the tape of message identifying signals following its respective message, transmitting means for each of said tapes, means for operating said transmitting means to transmit the message identifying signals ahead of its respective message, and means for transmitting said messages in the same sequential order as the order of association of said automatic signal transmitter with said perforating mechanisms.

11. In a telegraph system, a plurality of perforating mechanisms for storing messages in respective storage tapes with each message being terminated by an end-of-message signal, a transmitting circuit for the transmission of signals thereover, an automatic signal transmitter common to all of said perforating mechanisms, means controlled by the perforation of an end-of-message signal in its associated storage tape for controlling association of said automatic transmitter with the respective perforating mechanism to cause perforation of additional signals in the tape accompanying each stored message, a memory unit for identifying the sequential order of association of said perforating mechanisms with said automatic transmitter, and means including said memory unit for automatically transmitting to said transmitting circuit one at a time messages stored in said tapes in the same sequential order as the association of said perforating mechanisms with said automatic transmitter.

12. In a telegraph system, a plurality of transmitters, a sending circuit for the transmission of signals thereover, means for randomly assigning an order of association of said transmitters with said sending circuit, a memory device having a predetermined number of individual links arranged in a continuous ring with each ring being capable of indicating an individual transmitter assignment, means including consecutive ones of said links for identifying the order in which said transmitters are to be associated with said circuit, and means operative on the association of a transmitter with said circuit to make the link identifying the same available for identifying the same or any one of the others of said transmitters.

References Cited in the file of this patent

UNITED STATES PATENTS

| | | |
|---|---|---|
| 2,569,478 | Locke | Oct. 2, 1951 |
| 2,570,505 | Watson | Oct. 9, 1951 |
| 2,582,707 | Light | Jan. 15, 1952 |
| 2,667,533 | Zenner | Jan. 26, 1954 |